Oct. 17, 1939.  M. L. McHURON  2,176,352
FISHING POLE HOLDER
Filed Aug. 22, 1938

INVENTOR.
MARTHA L. McHURON.
BY
Allen + Allen
ATTORNEYS.

Patented Oct. 17, 1939

2,176,352

UNITED STATES PATENT OFFICE 2,176,352

FISHING POLE HOLDER

Martha L. McHuron, Patriot, Ind.

Application August 22, 1938, Serial No. 226,031

2 Claims. (Cl. 248—38)

This invention relates to devices for supporting fishing poles and is adapted to be used either by fastening to the side of a boat, or by being implanted into the ground. Generally speaking, devices of this type are known, but all such devices have been subject to a common objection, i. e., in order to remove the fishing pole from the holder a compound movement was necessary. The forward end of the pole had to be raised, and then the pole had to be axially moved in a forward direction in order for the heel of the pole to clear the holder.

It is an object of my invention to provide a fishing pole holder which is extremely simple so that it may be manufactured with a minimum of machining operations, which will be light, which may be taken apart for packing so as to consume a minimum of space, and which is angularly adjustable so as to permit the fisherman to take advantage of the direction of the current.

It is another object of my invention to provide a device as above outlined having two supporting elements, one of said supporting elements being located at the forward end and including a V-shaped notch, and the other element being disposed in the rear of the holder and being so formed that the fishing pole may be removed by a simple swinging movement without danger of binding or interference with the heel of the fishing pole.

These and other objects of my invention which will be pointed out hereinafter, or which will appear to one skilled in the art upon reading these specifications, I accomplish by that certain construction and arrangement of parts of which I shall now describe an exemplary embodiment.

Reference is now made to the drawing forming a part hereof and in which.

Figure 1:
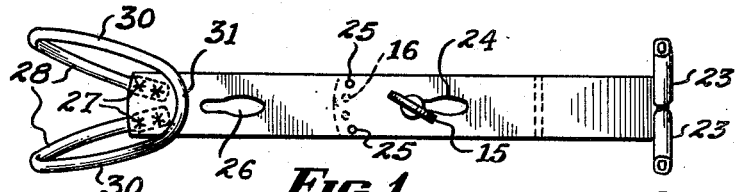
Figure 1 is a plan view of the device according to my invention.
Figure 2:
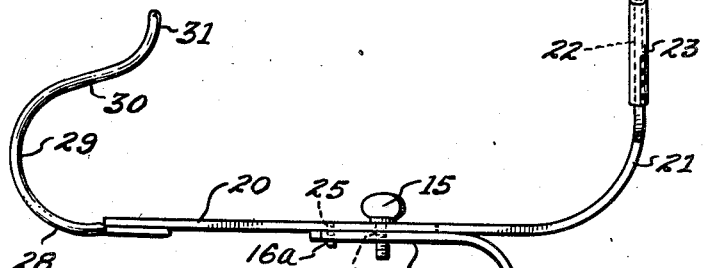
Figure 2 is a side elevation of the same.
Figure 3:
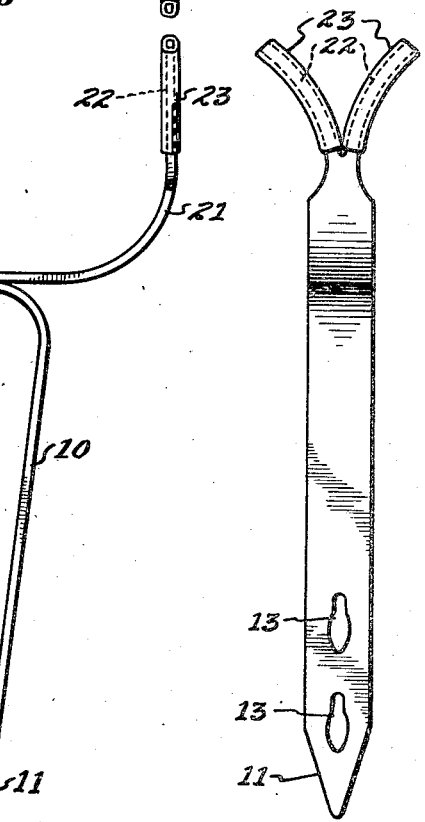
Figure 3 is a front elevation of the same.

Briefly in the practice of my invention I provide two members which may be formed of strap iron or any other suitable material. One of these members indicated at 10 is pointed at one end, as indicated at 11 so that it may be implanted in the ground. Near the other end the member 10 is bent over to provide a supporting portion 12. Preferably the angle between the portions 10 and 12 is less than 90 degrees so that when the member 10 is vertically disposed the member 12 will provide a slant. Preferably the member 10 is provided with one or more keyhole slots indicated at 13, for purposes which will be pointed out hereinafter. The portion 12 is provided with a threaded hole 14 adapted to cooperate with a thumb screw 15. There are also provided along an arc drawn about the center of the hole 14 a series of depressions 16. The members 16 may be drilled holes or punched holes, or simply partially punched holes, as shown in the drawing, the portions 16a representing the partially punched out metal.

The pole supporting member indicated generally at 20 is constituted also from a piece of strap iron or the like which is bent upwardly at its forward end as indicated at 21 and is provided with the outwardly branching arms 22. These arms are preferably covered by means of rubber sleeves 23. Although the angle between the portions 21 and 20 may be varied, I prefer to make it slightly more than 90 degrees so that the portion 21 will be in a more nearly vertical position when the portion 10 is vertically disposed. The member 20 is provided with a keyhole slot 24 to permit the passage of the head of the thumb screw 15, and also is provided with one or more projections 25 which are adapted to enter into the depressions 16. These projections may be formed by punching, as described above in connection with the depressions 16, and are so spaced that they engage with the depressions 16 when the thumb screw occupies the position shown in Figure 1 in relation to the keyhole slot 24.

The angular adjustment of the member 20 with respect to the member 12 is accomplished by loosening the thumb screw 15 and slightly turning the two members with respect to each other so that the projections 25 enter into other depressions 16. Preferably a projection 25 is formed near each margin of the member 20 so that a maximum of adjustability in both directions is achieved.

The member 20 may be provided with an additional keyhole slot 26 for purposes which will be described hereinafter.

Figure 4:
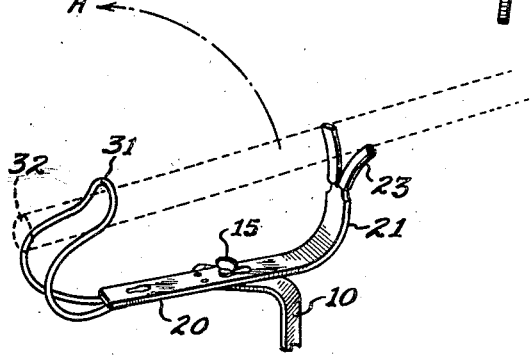
Figure 4 is a perspective view of the device on a reduced scale illustrating how the holder may be angularly adjusted.

At the rear end of the member 20 I provide a loop for holding the heel of the fishing pole. This loop may be formed from wire and may, for example, be $\frac{1}{16}$ of an inch in diameter. The two ends of the loop are welded or otherwise fastened to the member 20, as indicated at 27. From these points they extend rearwardly and outwardly, as indicated at 28, and then upwardly, as indicated at 29, and forwardly and toward each other, as indicated at 30, and finally terminate in an upwardly directed loop, as indicated at 31. The purpose of this formation of the loop is clearly shown in Figure 4. It will be seen from Figure 4 that if the fishing pole is grasped between the forwardly and rearwardly disposed supporting elements and is raised upwardly, as indicated by the arrow A, the portion 31 will act as a fulcrum, and the heel of the pole which is indicated at 32 will swing downwardly between the arms of the loop without danger of binding and without interference from other portions of the holder.

The device may be used in a number of different ways. The member 10 may be implanted into the ground, and the device pointed at any angular setting, as shown, for example, in Figure 4. If desired, the member 10 may be fastened to a vertical portion in a boat by any desired means as, for example, by the provision of thumb screws mounted on a vertical portion of a boat and spaced so as to utilize the keyhole slots 13.

If desired, the two parts of the device may be disassembled, and the portion 20 may be fastened to a horizontal portion of the boat by means of either or both of the keyholes 24 and 26.

It will, of course, be observed that for packing purposes the two parts may be disassembled, and the part 10 may be nested within the part 20 so as to conserve space. In the claims, the word "rearwardly" means toward the heel of the fishing pole, and "forwardly" means toward the tip of the pole.

It is to be understood that modifications may be made in my invention without departing from the spirit thereof, and that I do not intend to limit myself otherwise than as pointed out in the claims which follow.

Having now fully described my invention, what I claim as new and desire to secure by Letters Patent is:

1. A fishing pole holder comprising a supporting member and a pole holding member, means for fastening said members together in a variety of positions of angular adjustment, said supporting member having a pointed end and being provided with perforations whereby it may be either implanted in the ground or fastened to a vertical portion of a boat by thumb screws or the like, and said pole holding member having a V-shaped frontal pole supporting element and a rear pole supporting member, said rear member comprising a loop extending rearwardly, then upwardly, then forwardly, and again upwardly, and said loop being wider through said first mentioned upwardly extending portion.

2. In a fishing pole holder having a frontal pole supporting element, a pole heel supporting element comprising a loop shaped member extending rearwardly, then upwardly, then forwardly, and then again upwardly, said loops being wider in said first mentioned upwardly extending portion and becoming gradually narrower toward each end of the loop.

MARTHA L. McHURON.